May 30, 1961 P. J. FRANKLIN ET AL 2,986,660

SWITCHING CIRCUIT EMPLOYING SINGLE SHOT LOW VOLTAGE SWITCHES

Filed Jan. 14, 1959

INVENTORS
PHILIP J. FRANKLIN
ROBERT F. SHOEMAKER
ROBERT W. TUCKER

BY S. J. Rotondi, A. O. Dupont,
F. E. McGee & N. Cass

United States Patent Office 2,986,660

Patented May 30, 1961

2,986,660

SWITCHING CIRCUIT EMPLOYING SINGLE SHOT LOW VOLTAGE SWITCHES

Philip J. Franklin, Washington, D.C., Robert F. Shoemaker, McLean, Va., and Robert W. Tucker, Rockville, Md., assignors to the United States of America as represented by the Secretary of the Army Filed Jan. 14, 1959, Ser. No. 786,898

4 Claims. (Cl. 307—108)

(Granted under Title 35, U.S. Code (1952), sec. 266)

The invention described herein may be manufactured and used by or for the Government for governmental purposes without the payment to us of any royalty thereon.

This invention relates to switching circuits in general, and more particularly to a switching circuit employing a plurality of single shot low voltage switches. A preferred form of such a single shot low voltage switch is disclosed in patent application Serial No. 646,507 filed March 15, 1957, in the name of Robert F. Shoemaker et al.

In accordance with the present invention it is an object to incorporate a plurality of these single shot low voltage switches in a switching circuit so that a wide range of voltage breakdowns can be provided.

Another object of this invention is to incorporate these single shot low voltage switches in a switching circuit which can readily be matched to other electronic circuitry.

A further object in addition to the above-mentioned objects is to incorporate these single shot low voltage switches in a switching circuit which achieves reliable operation using switches having non-critical breakdown voltages and having dimensions which may likewise be non-critical.

Another object in accordance with any or all of the above-mentioned objects is to incorporate these single shot low voltage switches in a switching circuit so that an input signal having a voltage much less than the breakdown voltage of a single switch may be used to reliably trigger the circuit. Yet another object of this invention is to provide a fast acting switching circuit which permits a low power signal to control the flow of a very much greater output power.

The specific nature of the invention, as well as other objects, uses and advantages thereof, will clearly appear from the following description and from the accompanying drawings, in which—

Figure 1:
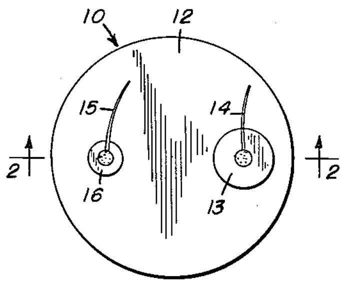
Fig. 1 is a plan view of the single shot low voltage switch disclosed in the aforementioned application.
Figure 2:
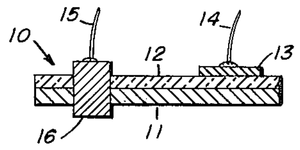
Fig. 2 is an exaggerated sectional view of the low voltage switch of Fig. 1.

In Figs. 1 and 2, there is shown a voltage responsive switch which comprises a piece of substantially pure aluminum 11, about the size of a dime, on which there is formed an anodized film 12, formed in a six percent by weight chromic acid bath. On the exceedingly thin anodized film 12, there is placed a thin layer of silver 13 deposited through a screen, as is customary in printed circuits. After the silver 13 has been deposited, the assembly is baked to remove the solvent in the deposited material. The silver deposit 13 has a diameter of about a quarter of an inch. A wire 14 is soldered to the silver layer 13 and a wire 15 is connected to the aluminum base 11 at a spot 16, where a hole has been punched through the base to expose the metal of the base. The wire 15 makes contact with the exposed area by a rivet or by being crimped in the hole. The assembly is next coated with a final coating of a plastic so that only the wires are visible.

The base plate 11 is usually stamped from thin strips of substantially pure aluminum which are anodized by being placed in a six percent by weight of chromic acid bath, and which have current passed through them for about twelve minutes. The strips are next washed carefully to remove the electrolyte and are then dried in an oven, and after being dried the silver electrodes are placed on the anodized film. After the wires 14 and 15 have been secured to the switch assembly, the assembly is dipped in an epoxy-stearamide mixture to give mechanical strength and to provide moisture-vapor resistance.

The capacitance of a switch of the above approximate dimensions is of the order of .002 microfarad. The capacitance depends upon the area of the electrodes opposed to each other, upon the nature of the dielectric between them and the thickness of the dielectric. As mentioned previously, in the present invention the film is exceedingly thin. The capacitance can of course be made smaller by reducing the area of the silver layer, but the dimensions given herein have been found acceptable for the present purpose.

In switches constructed as described above, the breakdown voltage may be of the order of about 12 volts, but it is to be understood that this voltage is not given by way of limitation. Before breakdown, the switch 10 appears as a capacitor having a capacitance dependent upon the specific constructional dimensions employed, which for the above-described construction is of the order of .002 microfarad. The leakage resistance of the switch 10 prior to breakdown is of the order of 3000 megohms. When the voltage is applied to the switch 10 sufficient to charge the switch capacitance to its breakdown voltage, the film 12 ruptures, effectively and irreversibly closing the switch 10. In the closed condition, switch 10 has a resistance of the order of a fraction of an ohm.

Figure 3:
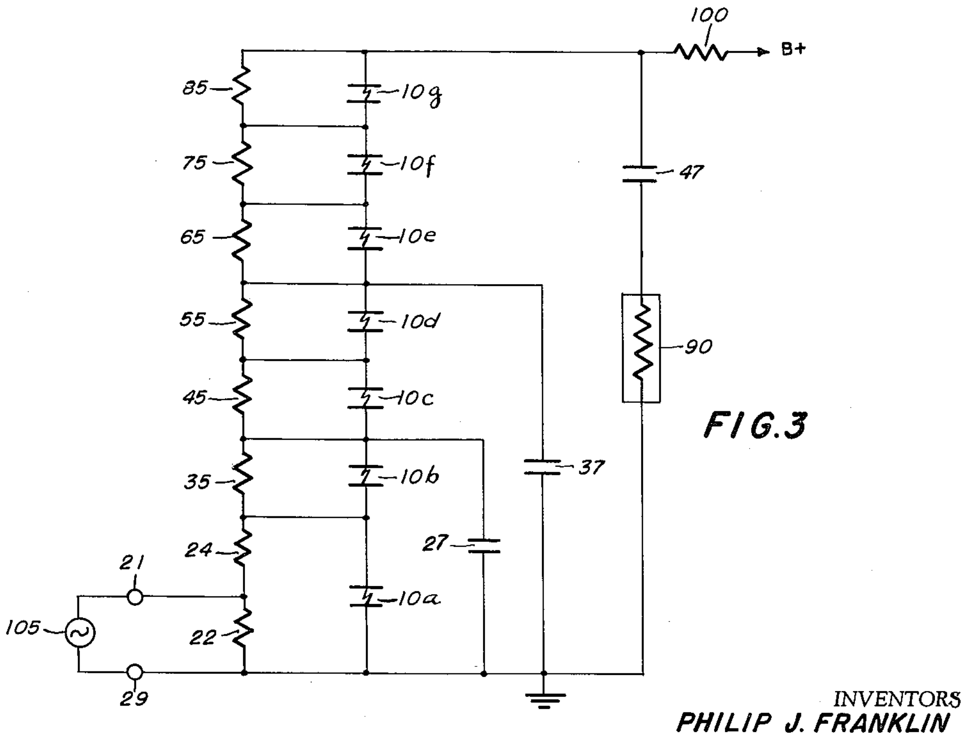
Fig. 3 is a schematic diagram of a switching circuit incorporating the single shot low voltage switches of Figs. 1 and 2, in accordance with the invention.

To make it possible to employ the relatively low voltage switch 10 to provide breakdown voltages so that correspondingly greater energy can be stored in a given capacitor, to permit the use of switches with non-critical breakdown voltages and capacitances, and also to provide greater versatility for making use of the switches 10 with other electronic circuitry, the novel switching circuit of Fig. 3 is employed in accordance with the present invention. In Fig. 3, seven switches 10*a*, 10*b*, 10*c*, 10*d*, 10*e*, 10*f*, and 10*g* are stacked in series with each other and with a storage capacitor 47 and a load 90. One end of the stack of switches and one end of the load 90 are connected to circuit ground. A voltage source B+ is connected to charge up the storage capacitor 47 through a charging resistor 100 to a voltage which is less than seven times the breakdown voltage of a single switch 10 so as to prevent breakdown of the circuit. The resistor 100 is provided so that the storage capacitor 47 charges up slowly, thereby preventing premature activation of the load 90. It is to be understood that the load 90 may be any suitable device, such as an explosive detonator.

Equalizing resistors 22 and 24 in series, 35, 45, 55, 65, 75 and 85, are respectively connected across the switches 10*a*, 10*b*, 10*c*, 10*e*, 10*f* and 10*g* to assure approximately equal voltages across each of the switches regardless of their capacitances, which would otherwise determine the voltages across each of the switches. Resistors 24, 35, 45, 55, 65, 75 and 85 are all of equal value. Resistor 22 is approximately $10^{-3}$ the value of the other equalizing resistors. This permits the switch capacitances to vary over wide limits without effecting the operation of the circuit. The resistance across the switch 10*a* consists of the resistors 24 and 22 in series, the resistor 22 serving as an input resistor for the circuit.

The input resistor 22 serves several purposes. First, it serves to impedance match the input signal from a triggering source 105 applied to the terminals 21 and 29 to trigger the circuit of Fig. 3. Since the resistor 22 may ordinarily be of a small value compared to that of the other equalizing resistors 35, 45, 55, 65, 75 and 85, its value can be chosen to match the output impedance of the triggering source 105. The sum of the resistors 22 and 24 determines the equalizing resistance across the switch **10*a***.

Secondly, since the input resistor 22 is ordinarily much smaller than the other equalizing resistors, and also the resistor 24, no significant amount of the voltage across the stack of switches **10*a* . . . 10*g* will appear across the resistor 22. Therefore, there is no detrimental voltage on the resistor 22 which might affect the operation of the triggering source 105 connected thereacross. Also, if the resistor 22 were not present so that the triggering source 105 were directly connected across the switch 10*a*, it would be possible for the voltages across the switches to shift, due to the impedance of the energy source 105 changing the effective value of the equalizing resistance across the switch 10*a* which may cause a premature breakdown of the circuit. It can be seen, therefore, that the input resistor 22** serves to isolate the switch circuit of Fig. 3 from its associated external circuitry, and vice versa.

Another important feature of the circuit of Fig. 3 is the use of the firing capacitors 27 and 37 at suitable points along the stack of switches **10*a* . . . 10*g*. It can be seen that the capacitor 27 is connected between the switches 10*b* and 10*c*, while the capacitor 37 is connected between the switches 10*d* and 10*e*. It is to be understood that the capacitors 27 and 37 may be suitably connected at other points along the stack of switches. The purpose of the capacitors 27 and 37** is to make it possible to use switches having a less critical breakdown voltage and ensure reliable operation of the circuit, as will be seen from the following description of the operation of the circuit of Fig. 3.

In operation, the input signal from the source 105 is applied across the input resistor 22. The triggering source 105 may be a pulse or, if so desired, a slowly changing voltage. Initiation of the circuit of Fig. 3 may be brought about by either a positive or a negative voltage as will now be shown. It can be seen that if the source 105 applies a positive voltage of about 12 volts with respect to ground (which assumedly is the breakdown voltage of the switch **10*a*) the switch 10*a* will charge to its breakdown voltage, thereby initiating breakdown of the circuit. For a negatively applied voltage by the source 105, the resistor 22 permits a much smaller voltage to cause breakdown of the switch 10*a*. This is because if the storage capacitor 47 is initially charged to say 70 volts, the voltage across each of the switches 10*a* . . . 10*g* will be about 10 volts. Thus, when a negative voltage with respect to ground appears across the terminals 21 and 29, which is of the order of −2 volts, the resultant voltage across the switch will then be seen to be the 12 volts required for breakdown. It will be understood, therefore, that the use of the input resistor 22 makes it possible to adjust the voltage from the source 105** required to initiate the circuit.

If it is assumed that storage capacitor 47 is initially charged to 70 volts as before, it will be seen that the capacitors 27 and 37 will initially be charged up to 20 and 40 volts, respectively. When the first switch **10*a* breaks down and becomes a very low resistance, the full voltage across the capacitor 27 of 20 volts then appears across the second switch 10*b*. This 20 volts is clearly more than enough to reliably cause breakdown of the switch 10*b*, and thus the breakdown voltage of the switch 10*b* need not be critical at all. After breakdown of the second switch 10*b*, the capacitor 27 will be effectively shorted so that the voltage across the capacitor 37 of 40 volts now appears across the switches 10*c* and 10*d*. This 40 volts across the switches 10*c* and 10*d* is clearly more than sufficient to reliably cause the breakdown of these switches 10*c* and 10*d*. Upon breakdown of the switches 10*c* and 10*d*, the capacitor 37 is then effectively shorted, causing the full voltage of the storage capacitor 47, which is about 70 volts, to appear across the remaining switches 10*e*, 10*f* and 10*g*. As before, this 70 volts of capacitor 47 is clearly more than sufficient to reliably break down the switches 10*e*, 10*f* and 10*g*, thereby causing the energy stored in capacitor 47 to be discharged through the load 90. It can thus be seen that the capacitors 27 and 37 make it possible to employ switches which are non-critical. Of course, it is to be understood that the time constants provided by the resistors and capacitors of the circuit of Fig. 3 are chosen in accordance with well known practice to provide the circuit operation just described. In a typical embodiment of the invention, the capacitor 47 may be .5 microfarad, the resistor 100 about 5 megohms, the voltage B+ about 70 volts, the breakdown voltage of each of the switches 10*a* . . . 10*g* about 12 volts, the equalizing resistors 24 . . . 85 about 100 megohms, the input resistor 22 about 100 kilohms, and the capacitors 27 and 37** each about .05 microfarad. For a circuit having these values, the time required for breakdown of all the switches after triggering is of the order of a fraction of a microsecond.

Although a particular number of switches **10*a* . . . 10*g*, and capacitors 27 and 37**, have been illustrated in Fig. 3, it is to be understood that any number of switches may be employed in accordance with the invention. Also, it will be apparent that the embodiment shown is only exemplary and that various modifications can be made in construction and arrangement with the scope of the invention as defined in the appended claims.

We claim as our invention:

1. A switching circuit comprising in combination: a plurality of single shot low voltage switches connected in series, each of said switches having approximately the same breakdown voltage, a series connected storage capacitor and load across said plurality of low voltage switches, means for charging said storage capacitor to a predetermined D.-C. voltage without prematurely activating said load, said predetermined voltage having a value such that the voltage across each switch is less than its breakdown voltage, an aqualizing resistance connected across each switch to assure approximately equal voltages across each of the switches before the circuit is triggered, one of said equalizing resistances comprising first and second resistors in series, a triggering source, means for connecting said triggering source across said first resistor, and a plurality of firing capacitors each connected across successively larger numbers of said switches so that each firing capacitor is charged to a voltage proportional to the number of switches across which it is connected.

2. A switching circuit comprising in combination: a plurality of single shot low voltage switches connected in series, one end of the plurality of switches being connected to circuit ground, each of said switches having approximately the same breakdown voltage, a storage capacitor and a load connected in series between circuit ground and the other end of said plurality of switches, means for charging said storage capacitor to a predetermined D.-C. voltage without permaturely activating said load, said predetermined voltage having a value such that the voltage across each switch is less than its breakdown voltage, an equalizing resistance connected across each of the switches to assure approximately equal voltages across each of the switches before the circuit is triggered, the equalizing resistance across the switch of said plurality of switches which has one of its ends connected to circuit ground comprising first and second resistors in series, a triggering source, said first resistor having one of its ends connected to circuit ground and serving as an input resistor for said triggering source, and a plurality of firing capacitors each connected between circuit ground and successive points along said plurality of switches so that each of said firing capacitors is charged to a voltage proportional to the number of switches across which it is connected.

3. A switching circuit comprising in combination: seven single shot low voltage switches connected in series, one end of said seven switches being connected to circucit ground, each of said switches having approximately the same breakdown voltage, a storage capacitor and load across said seven switches, a source of D.-C. voltage having a predetermined value, a resistor connected between said source and the other end of said seven switches, the value of said resistor being chosen so that said storage capacitor is charged to said predetermined voltage without prematurely activating said load, said predetermined voltage having a value such that the voltage across each switch is less than its breakdown voltage, an equalizing resistance connected across each switch to assure approximately equal voltages across each of the switches before the circuit is triggered, the equalizing resistance across the switch of said seven switches which has one of its ends connected to circuit ground comprising first and second resistors in series, said first resistor having one of its ends connected to circuit ground and serving as an input resistor for a triggering source, and first and second firing capacitors each having one of its ends connected to circuit ground, the other end of said first firing capacitor being connected between the second and third switches of said seven switches counting from the circuit ground end, and the other end of said second firing capacitor being connected between the fourth and fifth switches of said seven switches counting from the circuit ground end.

4. A switching circuit comprising in combination: a plurality of single shot low voltage switches connected in series, a series connected storage capacitor and load across said plurality of low voltage switches, means for charging said storage capacitor to a predetermined D.-C. voltage without prematurely activating said load, said predetermined voltage having a value such that the voltage across each switch is less than its breakdown voltage, an equalizing resistance connected across each switch to assure that the voltage across each switch is less than its breakdown voltage before the circuit is triggered, one of said equalizing resistances comprising first and second resistors in series, a triggering source, means for connecting said triggering source across said first resistor, and a plurality of firing capacitors each connected across successively larger numbers of said switches so that each of said firing capacitors is charged to a voltage proportional to the number of switches across which it is connected.

References Cited in the file of this patent

UNITED STATES PATENTS

| | | |
|---|---|---|
| 2,545,474 | Kurland et al. | Mar. 20, 1951 |
| 2,779,014 | Mounce | Jan. 22, 1957 |
| 2,889,777 | Rabinow | June 9, 1959 |